2,694,695
Patented Nov. 16, 1954

2,694,695

UREIDO ESTERS OF ACRYLIC AND METHACRYLIC ACIDS

Newman M. Bortnick, Oreland, Pa., assignor to Rohm & Haas Company, Philadelphia, Pa., a corporation of Delaware No Drawing. Application April 10, 1953,
Serial No. 348,102

12 Claims. (Cl. 260—77.5)

This invention relates to polymerizable ureido esters of acrylic and methacrylic acids having the general formula $$CH_2=C(R)COO-A-NH-CO-NH_2$$

in which R represents a hydrogen atom or a methyl group, and A represents an alkylene group; i. e., a saturated, divalent, aliphatic hydrocarbon group. This invention also relates to the homopolymers of these compounds and to copolymers of the compounds and other copolymerizable compounds which contain at least one vinylidene group, $CH_2=C<$.

The compounds of this invention are prepared by reacting ammonia with an isocyanato ester of acrylic or methacrylic acid according to the following representation $$NH_3 + CH_2=C(R)COO-A-NCO \rightarrow$$
$$CH_2=C(R)COO-A-NH-CO-NH_2$$

in which the characters, R and A, have the significance described above.

The isocyanato esters which are employed herein are themselves the subject of another of my applications for Letters Patent, Serial No. 319,603, filed November 8, 1952.

It is to be noted that the alkylene groups, which are represented by the character A above, remain intact during the reaction. Compounds in which the alkylene group, A, contains two to fourteen carbon atoms in straight or branched chains are prepared in this way from the corresponding isocyanato esters. The products which have been most satisfactory, however, from the standpoint of ease of polymerization and copolymerization and which have been most useful are those in which A represents the following groups:

$$-CH_2CH_2-; \quad -CH_2CH_2CH_2-$$
$$\overset{CH_3}{\underset{|}{-CH_2CH-}}$$

The above reaction is carried out at a temperature from about 0° C. to about 50° C.; but it is preferred to employ temperatures from about 0° C. to about 20° C., i. e., room temperature or lower. The reaction is exothermic and care must ordinarily be taken to prevent the temperature from rising above 50° C. where polymerization takes place. It is advisable to use an inert solvent in order to moderate the reaction and for this purpose a hydrocarbon solvent such as benzene, toluene, xylene, pentane and the like is recommended.

The compounds of this invention undergo addition polymerization alone and with other compounds containing a vinylidene group, $CH_2=C<$. Such polymerization can be carried out in bulk or in solution or in emulsion. Emulsions of copolymers are particularly valuable for use in the shrink-proofing of wool as described in B. B. Kine's application for Letters Patent, Serial No. 348,100, filed April 10, 1953. The use of the polymers and copolymers of the present invention as water-repellent impregnants, particularly for leather, is disclosed and claimed in co-pending application Serial No. 429,704, filed May 13, 1954.

Examples of copolymerizable materials which give rise to thermoplastic copolymers with the products of this invention include the following: N-dialkyl acrylamides such as dimethyl acrylamide and diethyl acrylamide; esters of acrylic, α-chloroacrylic and methacrylic acids such as methyl acrylate, ethyl acrylate, 2-ethylhexyl acrylate, methyl methacrylate, tert.-butyl methacrylate, octyl methacrylates, butyl chloroacrylates and lauryl chloroacrylate; vinyl hydrocarbons such as styrene, α-methylstyrene, vinylnaphthalene and vinyltoluene; vinyl chloride and vinylidene chloride; allyl and methallyl esters of saturated aliphatic carboxylic acids such as allyl acetate and methallyl propionate; acrylonitrile; vinylpyridine and the like.

It should also be pointed out that the products of this invention are also copolymerizable with compounds like divinylbenzene, trivinylbenzene and diallyl phthalate, which contain a plurality of vinylidene groups but that the resultant copolymers are cross-linked and consequently non-thermoplastic.

The compounds of this invention can be copolymerized in all proportions with the materials noted above; and the particular ratio of comonomers chosen depends upon the desired end-use of the copolymer. At present it appears that at least 1%, on a molar basis, and preferably from about 2% to about 20%, of a ureido ester of this invention should be used in the preparation of copolymers inasmuch as such ratios assure the presence of a plurality of the reactive ureido groups in each macromolecule of the final copolymer.

Polymerization and copolymerization of the esters of this invention are both accelerated by the use of heat, ultraviolet light and free-radical catalysts. The following are typical of suitable catalysts: α,α'-bis-azoisobutyronitrile, methyl azoisobutyrate, benzoyl peroxide, acetyl peroxide, lauroyl peroxide, tert.-butyl hydroperoxide, di-tert.-butyl peroxide, tert.-butyl perbenzoate, stearoyl peroxide, ascaridol, cumene hydroperoxide, and "per salts" such as ammonium persulfate and ammonium perborate. The catalysts are use in amount from 0.01% to 5%, and preferably from 0.02% to 2%, based on the weight of the polymerizable compounds.

The following example is presented as embodying the preferred process for making the new ureido esters of this invention.

Example I

Into a three-necked flask equipped with thermometer, mechanical stirrer, gas-inlet tube and reflux condenser was charged a solution of 70 grams of β-isocyanatoethyl methacrylate, $$CH_2=C(CH_3)COOC_2H_4NCO$$

in 900 cc. of benzene. Anhydrous ammonia was passed into the vapor space above the solution while the latter was violently agitated. A white voluminous precipitate separated at once but addition of ammonia was continued for eight hours. The mixture was filtered, washed with several portions of benzene and dried to constant weight at room temperature at a reduced pressure of 15 mm. A 93% yield of β-ureidoethyl methacrylate, melting at 77–78° C., was thus obtained. Its composition, $$CH_2=C(CH_3)COOC_2H_4NHCONH_2$$

was confirmed by analysis.

The product polymerizes very readily, especially at temperatures above 50° C., in the presence of a free-radical catalyst such as benzoyl peroxide.

The other esters of this invention are prepared in the same way. Temperature is an important factor and it is recommended that no heat be applied to the reaction mixture so as to avoid polymerization of the products.

The following example is presented in order to illustrate the preparation and use of copolymers containing the compounds of this invention.

Example II

The following components were placed in a 500 cc. flask equipped with thermometer and mechanical agitator:

95.5 g. ethyl acrylate
4.5 g. β-ureidoethyl methacrylate
288 g. water
8.6 g. Non-ionic dispersing agent (a 70% aqueous solution of tert.-octylphenoxypolyethoxyethanol).

The mixture was cooled to 15° C. and then there were added 0.12 gram of ammonium persulfate and 0.16 gram of sodium hydrosulfite. The mixture was agitated and over a period of about 20 minutes the temperature rose to 40° C. Agitation was continued for 30 minutes while the resultant emulsion cooled to room temperature.

In a similar way emulsions were made of copolymers containing (a) 92.5% ethyl acrylate and 7.5% β-ureidoethyl methacrylate; (b) 95% butyl acrylate and 5% β-ureidoethyl acrylate; and (c) 95% octyl acrylate and 5% β-ureiodethyl methacrylate.

All of these emulsions had real value in the shrinkproofing of wool when they were padded on woolen fabric and heated to 240° F. or higher. The copolymer of butyl acrylate had less harshening effect on the wool than did the copolymers of ethyl acrylate, while the copolymer of octyl acrylate did not perceptibly alter the hand. In standard comparative wash tests, flannel treated with the emulsions described above and heated for 10 minutes at 300° F. shrank less than 10% after a 120 minute laundering at 140° F. while untreated flannel blanks invariably shrank to about one-half their original dimensions.

I claim:

1. Polymerizable ureido esters having the general formula $$CH_2=C(R)COO-A-NH-CO-NH_2$$

in which R is a member of the class consisting of a hydrogen atom and a methyl group and A represents an alkylene group containing 2 to 14 carbon atoms.

2. Polymerizable ureido esters of acrylic acid having the general formula $$CH_2=CHCOO-A-NH-CO-NH_2$$

in which A represents an alkylene group containing 2 to 3 carbon atoms.

3. Polymerizable ureido esters of methacrylic acid having the general formula $$CH_2=C(CH_3)COO-A-NH-CO-NH_2$$

in which A represents an alkylene group containing 2 to 3 carbon atoms.

4. Ureidoethyl acrylate having the formula $$CH_2=CHCOOC_2H_4NH-CO-NH_2$$

5. Ureidoethyl methacrylate having the formula $$CH_2=C(CH_3)COOC_2H_4NH-CO-NH_2$$

6. A polymer of a ureido ester which has the general formula $$CH_2=CRCOO-A-NH-CO-NH_2$$

in which R is a member of the class consisting of a hydrogen atom and a methyl group and A represents an alkylene group containing 2 to 14 carbon atoms.

7. A copolymer containing (a) at least 1%, on a molar basis, of a copolymerized ureido ester having the general formula $$CH_2=C(R)COO-A-NH-CO-NH_2$$

in which R is a member of the class consisting of a hydrogen atom and a methyl group and A represents an alkylene group containing 2 to 14 carbon atoms and (b) at most 99% of a copolymerized compound containing a vinylidene group, $CH_2=<$.

8. A copolymer containing (a) 2% to 20%, on a molar basis, of copolymerized ureidoethyl acrylate and (b) 98% to 80% of copolymerized ethyl acrylate.

9. A copolymer containing (a) 2% to 20%, on a molar basis, of copolymerized ureidoethyl methacrylate and (b) 98% to 80% of copolymerized ethyl acrylate.

10. A copolymer containing (a) 2% to 20%, on a molar basis, of copolymerized ureidoethyl acrylate and (b) 98% to 80% of butyl acrylate.

11. A copolymer containing (a) 2% to 20%, on a molar basis, of copolymerized ureidoethyl methacrylate and (b) 98% to 80% of butyl acrylate.

12. A copolymer containing (a) 2% to 20%, on a molar basis, of copolymerized ureidoethyl methacrylate and (b) 98% to 80% of octyl acrylate.

References Cited in the file of this patent

UNITED STATES PATENTS

| Number | Name | Date |
|---|---|---|
| 2,427,503 | Morgan | Sept. 16, 1947 |

OTHER REFERENCES

Ruzicka et al., Helv. Chem. Acta, 20, 109–28 (1923).